J. W. MEARS.
LUBRICANT DISTRIBUTER AND FILTER FOR INTERNAL COMBUSTION ENGINES.
APPLICATION FILED JAN. 13, 1919.
1,352,298. Patented Sept. 7, 1920.
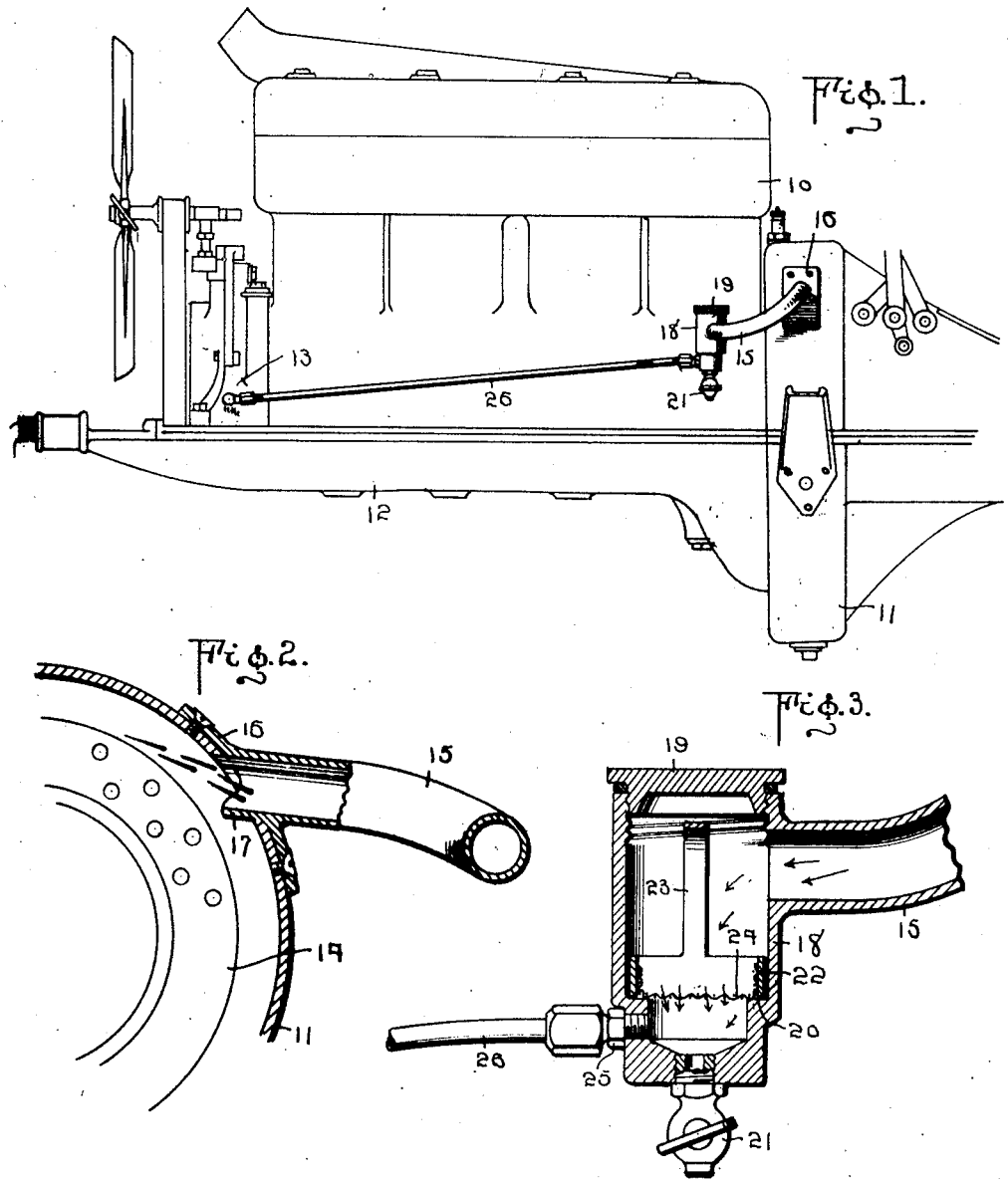
Inventor.
John W. Mears.

UNITED STATES PATENT OFFICE.

JOHN W. MEARS, OF FOREST HILLS, NEW YORK.

LUBRICANT DISTRIBUTER AND FILTER FOR INTERNAL-COMBUSTION ENGINES.

1,352,298. Specification of Letters Patent. Patented Sept. 7, 1920.

Application filed January 13, 1919. Serial No. 270,899.

*To all whom it may concern:*

Be it known that I, JOHN W. MEARS, a citizen of the United States, residing at Forest Hills, in the county of Queens and State of New York, have invented certain new and useful Improvements in Lubricant Distributers and Filters for Internal-Combustion Engines, of which the following is a specification.

This invention relates to an improved lubricant distributer and filter for internal combustion engines, being particularly designed for use upon engines of the Ford type although, as will later appear, the device may be readily employed upon other types of engines with equally good results.

As is well known, lubrication of a Ford motor is accomplished by partially filling the transmission case with lubricant to submerge the lower portion of the engine fly wheel and magneto connected thereto, so that when the engine is started the lubricant is thrown up by the engine fly wheel and magneto and is thence carried forwardly through a suitable tube to the front end of the crank case, whence the lubricant in gravitating back to the transmission case will lubricate the engine cylinders. The intake end of the oil tube mentioned upstands within the transmission case within the ring of magneto coils so that the lubricant must drip or gravitate from the magneto and upper portion of the transmission case in order to be caught by said tube. Obviously, therefore, when the engine is running at any considerable speed, the lubricant will be thrown by centrifugal force from the upper portion of the magneto and fly wheel against one side of the transmission case so that very little lubricant will drip or gravitate from the magneto, fly wheel and crank case so as to be caught by the tube and delivered to the front end of the crank case. This results in faulty lubrication in the two front cylinders of the engine, the supply of lubricant to these cylinders being decreased, as will be readily understood in view of the foregoing, in proportion as the speed of the engine is accelerated. Furthermore, since no provision is made for catching the lint from the transmission band linings or portions of the linings worn off, this lint as well as the pieces of the linings, fall into the lubricant contained within the lower portion of the transmission case. Also, considerable foreign matter accumulates in time within the reservoir of oil in the transmission case, such foreign matter finding its way in through the breather tube of the engine. Consequently, this foreign matter and lint is thrown up by the fly wheel and magneto of the engine and ultimately lodges in the intake end of the oil tube to cause either a whole or partial stoppage of this tube. Faulty lubrication of the front cylinders of the engine is thus further increased. The present invention has as its primary object, therefore, to provide a device wherein a constant circulation of lubricant will, while the engine is running, be maintained from the transmission case to the front of the crank case and wherein this circulating lubricant, in its passage from the transmission case to the front end of the crank case, will be filtered so that the reservoir of lubricant in the transmission case will always be kept free of lint or other foreign substances.

The invention has as a further object to provide a device so connected to the transmission case that the lubricant thrown from the upper portion of the fly wheel and magneto will be discharged directly against the mouth of the device so that regardless of the speed at which the engine is running, there will always be a flow of oil from the transmission case to the front end of the crank case.

And a still further object of the invention is to provide a device wherein the filter will be readily accessible and may be easily cleaned and wherein means will be provided for determining as to whether or not the filter is clogged and thus as to whether or not lubricant is properly flowing through the device.

Other and incidental objects will appear during the course of the detailed description of the invention. In the drawings, wherein I have illustrated the preferred embodiment of the invention, and wherein similar reference characters designate corresponding parts throughout the several views:

Figure 1 is a side elevation showing my improved device applied to an engine of the Ford type, Fig. 2 is a fragmentary sectional view showing the disposition of the intake or mouth of the device with respect to the engine fly wheel and magneto, and Fig. 3 is a fragmentary vertical sectional view more particularly illustrating the construction of the filter of the device.

Referring now more particularly to the drawings, I have shown my improved device in connection with an engine 10 of the Ford type. However, I do not wish to be limited in this regard since, as will appear as the description proceeds, the device may be used upon other types of engines with effective results. The transmission case of the engine is indicated at 11, the crank case at 12 and the timing gear case at 13. In Fig. 2, I have conventionally shown the engine magneto at 14, this magneto being, as is well known, carried by the engine fly wheel within the transmission case. The engine is lubricated by partially filling the transmission case with oil so that when the engine is running this oil will be thrown up within the transmission case and thence directed through an oil tube to the front end of the crank case, whence the lubricant gravitates back to the transmission case.

Coming now more particularly to the subject of the present invention, I employ an intake pipe 15 equipped at one end with an attaching plate 16 curved to fit the transmission case 11. As particularly shown in Fig. 2, an opening is formed in the transmission case and the mouth of the pipe is inserted into this opening, the pipe being formed at its lower side with a lip or scoop 17 projecting into the crank case. Connecting the plate 16 with the crank case is a plurality of screws or other suitable fastening devices. This construction provides an arrangement whereby the pipe may be readily attached to the crank case of a vehicle already in use. However, when incorporating the device in the engine structure at the time of the original manufacture thereof, the pipe 15 may, of course, be formed as an integral part of the transmission case. The intake pipe 15 curves laterally forward and inward with respect to the transmission case and carries a filter, this filter being particularly shown in Fig. 3 of the drawings. As there illustrated, the filter includes a preferably cylindrical casing 18 into the upper portion of which the pipe 15 opens. Normally closing the casing at its upper end is a removable cap 19 threaded into the casing and preferably a gasket is employed between the rim of this cap and the casing to provide a tight joint therebetween. Adjacent its lower end the casing is reduced to provide an internal annular shoulder 20 and threaded into the cupped bottom wall of the casing axially thereof is a test cock 21 which may be of any approved design. Removably fitting snugly within the casing is a filter basket including a ring or body 22 resting upon the shoulder 20 and provided with a handle or bail 23 upstanding within the casing. The ring 22 carries a filter screen 24 secured in any approved manner to the ring and while I have shown the use of only one screen still, it will be understood that the number of screens to be employed may be varied as desired. As will be seen, the handle 23 of the filter basket terminates adjacent the upper end of the casing so that by removing the cap 19 this basket may be readily displaced and the filter screen cleaned.

Tapped into the lower end portion of the casing 18 of the filter below the shoulder 20 is a nipple 25 to which is coupled at one end, a discharge pipe 26. This discharge pipe is, as particularly shown in Fig. 1, bent laterally and inwardly adjacent the filter so as to lie close to the base of the engine and inclines from the filter downwardly toward the front end of the engine. Adjacent its forward end, the pipe is provided with an elbow so that the forward terminal of the pipe may thus be directed to the timing gear case 13 into which the pipe is preferably tapped. However, the pipe may, of course, communicate with the forward end of the crank case at some other approved point.

Attention is now directed to the fact that the mouth of the intake pipe 15 is located in a plane slightly below the upper side of the engine magneto 14 and engine fly wheel and at such point that, when the engine is running, lubricant thrown by centrifugal force from the magneto will be directed into the mouth of said pipe and thus directly caused to enter the pipe, the lip or scoop 17 serving to collect the lubricant at the mouth of the pipe and direct the lubricant therein. As will be well understood, lubricant will be thus thrown from the engine magneto into the mouth of the pipe even when the engine is running slowly while, when the speed of the engine is accelerated, a greater quantity of lubricant will, with increased force, be thrown into the mouth of the pipe. Consequently, the volume of lubricant flowing through the pipe will be regulated automatically in direct ratio to the speed of the engine, a constantly increased flow of lubricant being had as the speed of the engine is increased and the necessity for augmented lubrication is increased. From the pipe 15, lubricant will flow into the casing 18 of the filter, pass through the filter screen 24 therein, and thence flow out through the discharge pipe 26 to be delivered to the front end of the engine crank case. A constant circulation of lubricant from the transmission case to the front end of the crank case will thus be had so that the front cylinders of the engine will always be well lubricated. At the same time the lubricant, upon its passage through the filter 18, will be filtered by the screen 24 so that all lint and other foreign matter in the lubricant will be removed therefrom. Stoppage of the pipe 26 to interrupt or retard the flow of lubricant will thus be prevented, it being noted in this connection, that the pipe 15 is somewhat larger than the discharge pipe so that this pipe 15 will not become clogged. By opening the test cock 21 while the engine is running, it may be readily determined as to whether or not the lubricant is properly flowing through the filter. Should the flow of lubricant at the test cock be found unsatisfactory, the filter basket may then be easily removed and the filter screen cleaned when, upon the replacement of the basket, the device will operate with its normal efficiency. This construction provides an arrangement whereby foreign substances collected in the lubricant within the engine will be constantly removed therefrom by the filter while the filter basket may, from time to time, be cleaned for entirely eliminating such foreign substances.

Having thus described the invention, what is claimed as new is:

1. A lubricator attachment for engines having rotating oil carrying parts inclosed in a casing, comprising a strainer receptacle including a face plate shaped to conform to the configuration of the casing and provided with a mouth protruding from the plate through the casing and receiving oil delivered centrifugally from the rotating parts.

2. A lubricator attachment for engines having rotating oil carrying parts inclosed in a casing, comprising a receptacle containing a removable foraminous filtering element offering relatively low resistance to fluid flow, and said receptacle including a mouth having a face plate shaped to conform to the configuration of the casing, said mouth protruding from the plate through the casing and receiving oil delivered thereto centrifugally at a tangent to the rotating parts.

3. A lubricating attachment, for engines having rotating oil carrying parts inclosed in a casing, comprising a face plate shaped to conform to the configuration of the casing and provided with a mouth protruding from the plate through the casing and receiving oil delivered from the rotating parts, a horizontal tube integral with the plate and communicating with the mouth, a vertical strainer chamber at the end of the tube, and a strainer removably positioned in said chamber to receive oil from the said tube.

In testimony whereof I affix my signature.

JOHN W. MEARS.